(12) United States Patent
Kim et al.

(10) Patent No.: US 11,064,150 B2
(45) Date of Patent: Jul. 13, 2021

(54) HIGH RESOLUTION USER INTERFACE

(71) Applicant: SAMSUNG ELECTRONICS CO., LTD., Suwon-si (KR)

(72) Inventors: Je-ik Kim, Yongin-si (KR); Joo-yoen Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/422,868

(22) Filed: Feb. 2, 2017

(65) Prior Publication Data
US 2017/0230603 A1   Aug. 10, 2017

(30) Foreign Application Priority Data

Feb. 4, 2016 (KR) .................. 10-2016-0014083

(51) Int. Cl.
*H04N 21/24* (2011.01)
*H04N 21/418* (2011.01)
(Continued)

(52) U.S. Cl.
CPC ......... *H04N 5/44504* (2013.01); *G09G 5/026* (2013.01); *G09G 5/14* (2013.01); *G09G 5/363* (2013.01); *G09G 5/391* (2013.01); *G09G 5/393* (2013.01); *G09G 5/395* (2013.01); *G09G 5/397* (2013.01); *H04N 5/45* (2013.01); *H04N 21/42204* (2013.01); *H04N 21/431* (2013.01);
(Continued)

(58) Field of Classification Search
CPC .......... G09G 5/026; G09G 5/14; G09G 5/363; G09G 5/391; G09G 5/393; G09G 5/395; G09G 5/397; H04N 5/4403; H04N 5/44504; H04N 5/44591; H04N 5/45; H04N 21/431; H04N 21/4312; H04N 21/4316; H04N 21/44004; H04N 21/4435; H04N 21/8146
USPC ......................................................... 725/42
See application file for complete search history.

(56) References Cited

U.S. PATENT DOCUMENTS 3,567,914 A * 3/1971 Neese .................. H05K 3/0005
430/30
5,179,651 A * 1/1993 Taaffe ..................... G06F 3/153
345/1.1
(Continued)

FOREIGN PATENT DOCUMENTS

CN    1922879 A    2/2007
CN    103679785 A    3/2014
(Continued)

OTHER PUBLICATIONS

Communication dated Jul. 7, 2017, issued by the European Patent Office in counterpart European Application No. 17154015.6.
(Continued)

*Primary Examiner* — Brian T Pendelton
*Assistant Examiner* — Jean D Saint Cyr
(74) *Attorney, Agent, or Firm* — Sughrue Mion, PLLC

(57) ABSTRACT

An approach for providing a user interface having a resolution corresponding to a resolution of a high resolution content is provided. The approach allocates at least one partial frame buffer based on a size and a location of a region on a screen of a display on which a user interface (UI) is displayed. The approach displays the UI based on at least one piece of partial graphic data obtained from the allocated at least one partial frame buffer.

21 Claims, 12 Drawing Sheets

(51) Int. Cl.

| | | |
|---|---|---|
| *H04N 21/439* | (2011.01) | |
| *H04N 21/44* | (2011.01) | |
| *H04N 21/81* | (2011.01) | |
| *H04N 5/445* | (2011.01) | |
| *G09G 5/393* | (2006.01) | |
| *G09G 5/395* | (2006.01) | |
| *H04N 21/443* | (2011.01) | |
| *G09G 5/397* | (2006.01) | |
| *H04N 21/431* | (2011.01) | |
| *G09G 5/391* | (2006.01) | |
| *G09G 5/02* | (2006.01) | |
| *G09G 5/14* | (2006.01) | |
| *H04N 5/45* | (2011.01) | |
| *H04N 21/47* | (2011.01) | |
| *H04N 21/422* | (2011.01) | |
| *G09G 5/36* | (2006.01) | |

(52) U.S. Cl.
CPC ..... *H04N 21/4312* (2013.01); *H04N 21/4316* (2013.01); *H04N 21/44004* (2013.01); *H04N 21/4435* (2013.01); *H04N 21/47* (2013.01); *H04N 21/8146* (2013.01); *G09G 2340/10* (2013.01); *G09G 2340/125* (2013.01); *G09G 2350/00* (2013.01); *G09G 2360/122* (2013.01); *G09G 2360/125* (2013.01); *G09G 2360/127* (2013.01); *G09G 2360/18* (2013.01)

(56) References Cited

U.S. PATENT DOCUMENTS

| | | | | |
|---|---|---|---|---|
| 5,220,312 A * | 6/1993 | Lumelsky | ................ | G09G 5/14 345/536 |
| 5,237,669 A * | 8/1993 | Spear | ................ | G06F 12/1491 711/2 |
| 5,577,203 A * | 11/1996 | Reinert | ................ | G09G 5/006 345/547 |
| 5,758,166 A * | 5/1998 | Ajanovic | ............ | G06F 13/4059 710/113 |
| 5,790,792 A * | 8/1998 | Dudgeon | ................ | H04L 29/06 709/212 |
| 5,864,342 A * | 1/1999 | Kajiya | ................ | G06T 11/001 345/418 |
| 5,864,512 A * | 1/1999 | Buckelew | .............. | G09G 5/363 365/189.15 |
| 5,883,640 A * | 3/1999 | Hsieh | .................. | G09G 5/393 345/467 |
| 6,157,365 A * | 12/2000 | Callway | ................. | G09G 5/395 345/636 |
| 6,353,450 B1 * | 3/2002 | DeLeeuw | ............. | G06F 3/0481 345/623 |
| 6,763,522 B1 * | 7/2004 | Kondo | ............... | H04N 5/44543 348/E5.097 |
| 6,853,355 B1 * | 2/2005 | Kang | ........................ | H04N 5/45 345/2.2 |
| 7,373,650 B1 * | 5/2008 | Rodriguez | .......... | H04N 5/44591 348/565 |
| 8,212,842 B2 | 7/2012 | Shiomi et al. | | |
| 9,646,527 B2 | 5/2017 | Kim et al. | | |
| 9,990,692 B2 | 6/2018 | Metcalfe | | |
| 2002/0056099 A1 * | 5/2002 | Takahashi | .............. | H04N 7/163 725/39 |
| 2002/0158865 A1 * | 10/2002 | Dye | ........................ | G06T 11/40 345/419 |
| 2004/0019681 A1 * | 1/2004 | Nakamura | .............. | H04L 29/06 709/226 |
| 2007/0296728 A1 * | 12/2007 | Aoki | ....................... | G09G 5/399 345/531 |
| 2008/0120389 A1 * | 5/2008 | Bassali | ..................... | G06F 5/14 709/207 |
| 2008/0122835 A1 * | 5/2008 | Falco, Jr. | ................ | G06T 19/20 345/419 |
| 2008/0134036 A1 * | 6/2008 | Kapur | ................. | G06F 3/04847 715/716 |
| 2012/0120320 A1 | 5/2012 | Chowdhry et al. | | |
| 2013/0050254 A1 * | 2/2013 | Tran | ......................... | G06F 3/14 345/629 |
| 2013/0135342 A1 | 5/2013 | Kang | | |
| 2014/0063030 A1 * | 3/2014 | Metcalfe | .................... | G06T 1/60 345/531 |
| 2014/0218378 A1 | 8/2014 | Roh et al. | | |
| 2014/0306957 A1 * | 10/2014 | Herrick | ................. | G06T 15/503 345/422 |
| 2014/0354624 A1 * | 12/2014 | Chaji | .................... | G06F 1/3218 345/212 |
| 2015/0084986 A1 | 3/2015 | Lee et al. | | |
| 2016/0100191 A1 * | 4/2016 | Mishra | ................ | H04N 19/176 375/240.12 |
| 2019/0197952 A1 | 6/2019 | Chaji | | |

FOREIGN PATENT DOCUMENTS

| | | |
|---|---|---|
| CN | 103688302 A | 3/2014 |
| CN | 105225623 A | 1/2016 |
| EP | 1720352 A1 | 11/2006 |
| EP | 1 768 098 A1 | 3/2007 |
| EP | 2 562 638 A1 | 2/2013 |
| JP | 2007-166498 A | 6/2007 |
| KR | 10-2013-0057588 A | 6/2013 |
| KR | 10-2014-0099135 A | 8/2014 |

OTHER PUBLICATIONS

Communication dated Dec. 7, 2018, issued by the European Patent Office in counterpart European Application No. 17154015.6.

Communication dated May 17, 2019 issued by the State Intellectual Property Office of P.R. China in counterpart Chinese Application No. 201710158317.1.

Communication dated Jan. 8, 2020, issued by the State Intellectual Property Office of P.R. China in counterpart Chinese Application No. 201710158317.1.

Communication dated Feb. 18, 2021, issued by the European Patent Office in counterpart European Application No. 17154015.6.

* cited by examiner

HIGH RESOLUTION USER INTERFACE

CROSS-REFERENCE TO RELATED APPLICATION

This application claims the benefit of Korean Patent Application No. 10-2016-0014083, filed on Feb. 4, 2016, in the Korean Intellectual Property Office, the disclosure of which is incorporated herein in its entirety by reference.

BACKGROUND

1. Field

The present disclosure relates generally to broadcasting and display apparatuses, and more particularly, to providing a user interface having a resolution corresponding to a resolution of a high resolution content.

2. Description of the Related Art

A user can view images and broadcasts displayed on a display apparatus. Typically, the display apparatus displays a broadcast selected by the user from among broadcast signals transmitted from a broadcasting station. However, there is a current global trend toward shifting from analog broadcasting to digital broadcasting.

A digital broadcast denotes a broadcast in which digital video and audio signals are transmitted. In contrast to an analog broadcast, a digital broadcast is resistant to external noise, and thus has less data loss. A digital broadcast allows for convenient error correction, has a higher resolution, and provides a clear screen. Further, a digital broadcast can provide an interactive service unlike that of an analog broadcast.

A typical digital broadcast provides content having high image quality, such as full high definition (FHD), an ultra high definition television (UHTV), etc. in order to provide more realistic content to a user. In this regard, the display apparatus is required to provide a user interface (UI) having an image quality corresponding to the image quality of the content.

A processor (for example, a CPU or a GPU) with enhanced processing speeds and a memory with a greater storage capacity are necessary for the display apparatus to display high resolution content and a UI. However, due to memory space and memory bandwidth limitations of a conventional display apparatus, it is difficult to provide a UI having a resolution corresponding to a resolution of high resolution content.

SUMMARY

In some exemplary embodiments, display apparatuses and display methods allocate frame buffers based on a size and a location of a region of a screen including a UI, in which the UI has a resolution corresponding to a resolution of high resolution content.

In some exemplary embodiments, display apparatuses and display methods allocate frame buffers based on a size and a location of a region of a screen including a UI, in which the memory space and memory bandwidth are reduced.

In other exemplary embodiments, a display apparatus includes: a display configured to display video content and a UI with a same resolution; and a controller configured to allocate at least one partial frame buffer based on a size and a location of a region on a screen of the display on which the UI is displayed, and control the UI based on at least one piece of partial graphic data obtained from the allocated at least one partial frame buffer.

In yet other exemplary embodiments, a display method includes: allocating at least one partial frame buffer based on a size and a location of a region on a screen of a display on which the UI is displayed; and displaying the UI, based on at least one piece of partial graphic data obtained from the allocated at least one partial frame buffer, with a same resolution as video content that is displayed.

DETAILED DESCRIPTION

Exemplary embodiments relate generally to broadcasting and display apparatuses, and more particularly, to providing a user interface having a resolution corresponding to a resolution of a high resolution content. Exemplary embodiments for providing a user interface having a resolution corresponding to a resolution of a high resolution content are described below with references to FIGS. 1-9.

Implementation of such exemplary embodiments may take a variety of forms, and exemplary implementation details are discussed subsequently with reference to the figures.

In an exemplary embodiment, a display can visually output image data. In another exemplary embodiment, a display can be an input apparatus when a display panel and a touch pad, configured to form a touch screen, are located in a display. In yet another exemplary embodiment, the display can be an input apparatus and can visually output image data. The display may include at least one of a liquid crystal display (LCD), a thin film transistor-liquid crystal display (TFT-LCD), an organic light-emitting diode (OLED), a flexible display, a three-dimensional (3D) display, an electrophoretic display, and a plasma display panel (PDP).

In an exemplary embodiment, a display apparatus is an output apparatus, including the display, that can visually display image data. The display apparatus may be connected to a desktop, a laptop, a tablet personal computer (PC), a camera, a cellular phone, a storage medium, and any other electronic devices capable of receiving image data wirelessly or by wire known by one of ordinary skill in the art. In an exemplary embodiment, the display apparatus can receive an analog broadcast signal or a digital broadcast signal. In an exemplary embodiment, the display apparatus can be implemented as a flat display apparatus, a curved display apparatus, or a flexible display apparatus having an adjustable curvature. The display apparatus can be a PC monitor, a television (TV) monitor, or a large format display (LFD). In an exemplary embodiment, the display apparatus can include two or more displays.

In an exemplary embodiment, a screen is a part of the display and the display apparatus in which content is outputted.

In an exemplary embodiment, a user can be a person who controls a function or an operation of the display apparatus.

Figure 1:
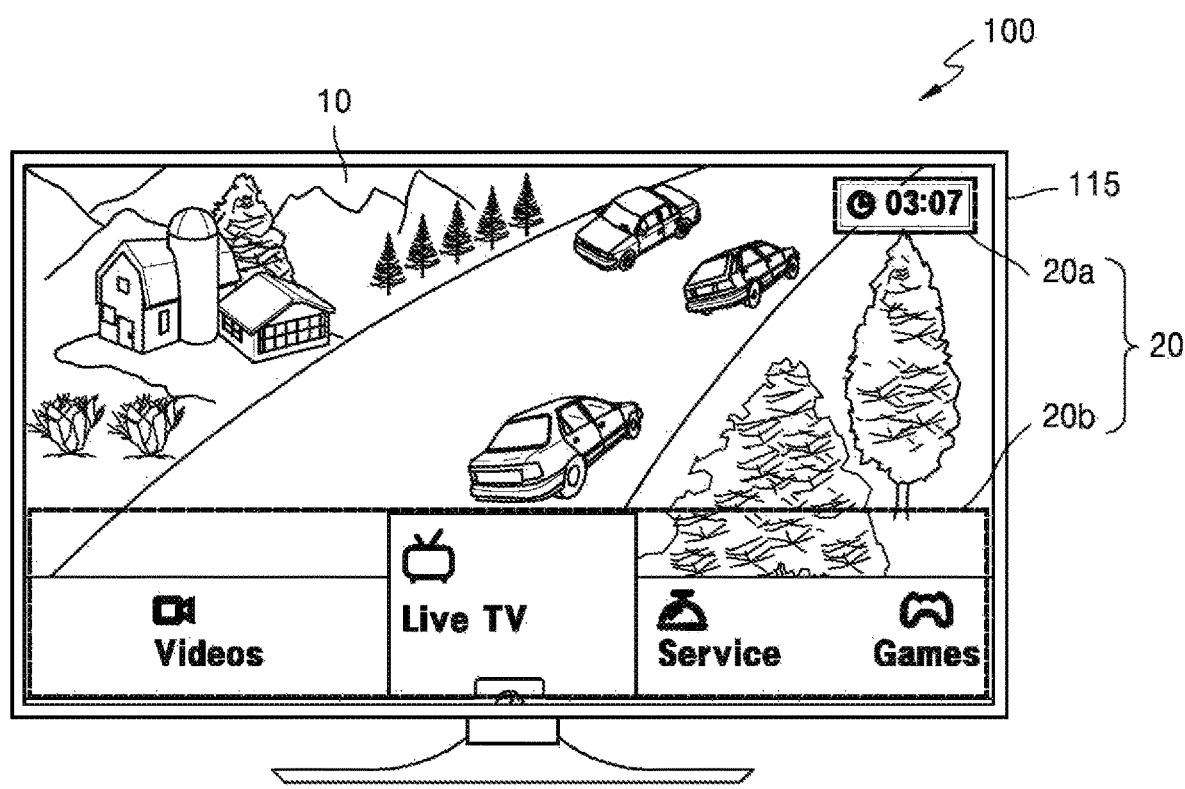
FIG. 1 illustrates a display apparatus, according to an exemplary embodiment.
Figure 1:
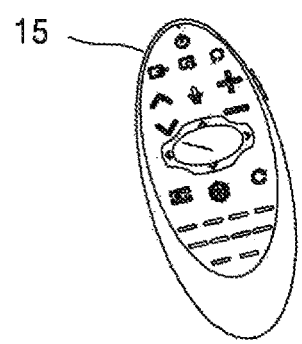

FIG. 1 illustrates a display apparatus 100, according to an exemplary embodiment. In some exemplary embodiments, the display apparatus 100 displays video content 10 and a user interface (UI) 20 on a screen of a display 115. In an exemplary embodiment, a control device 15 provides an input to control the display apparatus 100.

An output resolution of the display apparatus 100 can include high definition (HD), full high definition (FHD), ultra HD (UHD), or a resolution higher than the UHD. The display apparatus 100 can be implemented as a flat display apparatus, a curved display apparatus, or a flexible display apparatus having an adjustable curvature.

In an exemplary embodiment, the display apparatus 100 displays content on a screen configured as a predetermined number of pixels. For example, when the display apparatus 100 outputs content having an UHD resolution, the display apparatus 100 outputs a screen configured as pixels arranged 3840 horizontally and 2160 vertically, i.e. 3840×2160 pixels.

In an exemplary embodiment, the control device 15 controls the display apparatus 100 through short-range communication including infrared or Bluetooth. The control device 15 may control a function of the display apparatus 100 by using at least one of provided keys (including buttons), a touch pad, a microphone (not shown) capable of receiving a user's voice, and a sensor (not shown) capable of recognizing a motion of the control device 15 by a user. The control device 15 may include power on/off buttons to turn on or off the display apparatus 100. The control device 15 may also change channels of the display apparatus 100, adjust a volume, select terrestrial/cable/satellite broadcasts, or set an environment.

In an exemplary embodiment, the video content 10 can be a video included in a received broadcast signal, a video reproduced by executing an application, or any other video known in the art.

In an exemplary embodiment, the UI 20 includes one or more objects (for example, an image text, an icon, etc.) of which a user can interact. In some exemplary embodiments, the UI 20 includes a first UI 20a and a second UI 20b. For example, the second UI 20b includes an item presenting video content such as movie, a soap opera, etc. that is provided by the display apparatus 100, an item presenting a digital broadcast, and an item presenting a game provided by the display apparatus 100. The first UI 20a, for example, may include text providing a time.

In an exemplary embodiment, when the display apparatus 100 simultaneously displays the video content 10 and the UI 20, the display apparatus 100 displays the video content 10 and the UI 20 with the same resolution, that is the display apparatus 100 displays the UI 20 having an image quality corresponding to the image quality of the video content 10.

In an exemplary embodiment, order for the display apparatus 100 to output the screen, the display apparatus 100 outputs a screen utilizing a memory space of a frame buffer corresponding to the number of pixels included in the screen of the display apparatus 100. In another exemplary embodiment, the frame buffer is a separately provided storage space to temporarily store information to be displayed on each pixel of the display 115. The frame buffer may be configured as, for example, a random access memory (RAM) (not shown). For example, when the display apparatus 100 needs 32 bits per pixel in order to process graphic data for outputting the screen configured as 3840×2160 pixels, the memory space of the frame buffer may be 3840×2160×4 (Bytes)=31.64 MB. In this case, the display apparatus 100 includes the frame buffer with a capacity of 32 MB.

In an exemplary embodiment, the frame buffer may include a video frame buffer and a graphic frame buffer. The video frame buffer stores video data corresponding to the video content 10. The graphic frame buffer stores graphic data corresponding to the UI 20.

In some exemplary embodiments, the video data stored in the video frame buffer and the graphic data stored in the frame buffer may be obtained 60 times per second, that is, the display apparatus 100 outputs the video data and the graphic data at 60 frames per second (Fps).

In an exemplary embodiment, the display apparatus 100 allocates at least one partial frame buffer based on a size and a location of a region on which the UI 20 is displayed. For example, referring to FIG. 1, the display apparatus 100 includes two partial frame buffers corresponding to respective regions on which the first UI 20a and the second UI 20b are displayed.

In an exemplary embodiment, a partial frame buffer can correspond to a part of a memory space of a graphic frame buffer that stores graphic data for displaying a UI.

In an exemplary embodiment, for the cases in which an entire memory space of a frame buffer is only partially used, a memory bandwidth is improved when the display apparatus 100 allocates a partial frame buffer based on a size and a location of a region on which a UI is displayed.

In an exemplary embodiment, the memory bandwidth can be a data amount processed per second, expressed as Byte/sec. The memory bandwidth can be a data amount per second stored in the frame buffer and accessed by the display apparatus 100. For example, referring to FIG. 1, the number of pixels corresponding to an entire screen may be 3840×2160, the number of pixels corresponding to a region on which the second UI 20b is displayed may be 3840×500, and the number of pixels corresponding to a region on which the first UI 20a is displayed may be 500×200. When the display apparatus 100 allocates at least one partial frame buffer corresponding to the first UI 20a and the second UI 20b, the memory space of the partial frame buffer may be ((3840× 500)+(500×200)×4 Bytes)=8 MB. If the display apparatus 100 obtains graphic data stored in the partial frame buffer at 60 Fps, the memory bandwidth may be 0.48 GB/sec by 8 MB×60 Fps. When the display apparatus 100 allocates the partial frame buffer as described above, the memory bandwidth may be reduced to ¼ of a memory bandwidth when an entire memory space of the frame buffer is used i.e. 32 MB×60 Fps=1.92 GB/sec.

In an exemplary embodiment, the display apparatus 100 operates in a home mode or a store mode. The home mode may be a mode set when the display apparatus 100 is actually used. The store mode may be a mode set when the display apparatus 100 is placed for sale.

In an exemplary embodiment, when the display apparatus 100 operates in the store mode, the screen can be brighter or can have a higher contrast than when the display apparatus 100 operates in the home mode. The display apparatus 100 can display a UI for an advertisement including specification information of the display apparatus 100, information about applications included in the display apparatus 100, and function information of the display apparatus 100 in the store mode.

In another exemplary embodiment, when the display apparatus 100 operates in the store mode, the UI for the advertisement can be displayed on a predetermined location of the display 115. The display apparatus 100 allocates a partial frame buffer corresponding to the UI for the advertisement based on the predetermined location. In an exemplary embodiment, the predetermined location can be programmed at the time of manufacture of the display apparatus 100 or can be determined according to a user input.

In an exemplary embodiment, when the display apparatus 100 operates in the home mode, the display apparatus 100 may not display the UI for the advertisement and can display the UI 20a including the items corresponding to the video content 10, the digital broadcast, the game, etc. as shown in FIG. 1.

A case in which the display apparatus 100 does not display the UI for the advertisement is described below.

Figure 2:
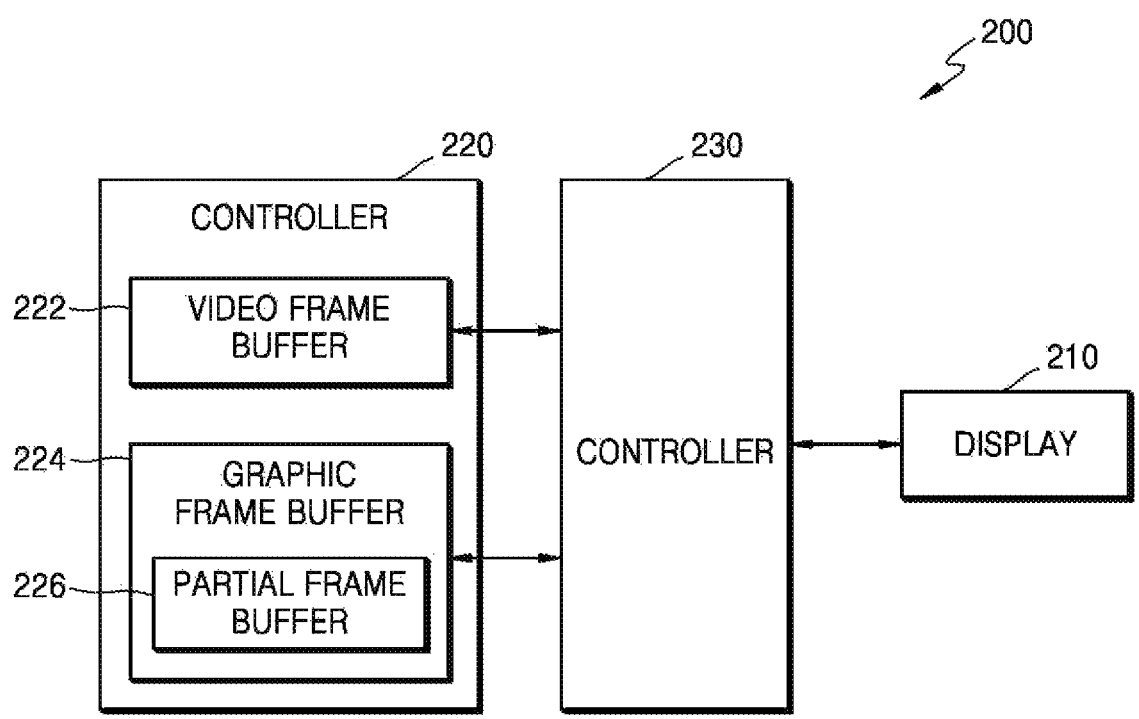
FIG. 2 is a block diagram of a display apparatus, according to an exemplary embodiment.

FIG. 2 is a block diagram of a display apparatus 200, according to an exemplary embodiment.

In some exemplary embodiments, the display apparatus 200 outputs content having a predetermined resolution. For example, the display apparatus 200 may display a video content and a UI that have a first resolution. The first resolution may include, for example, an UHD and a resolution higher than the UHD. The display apparatus 200 includes a display 210, a storage unit 220, and a controller 230.

In an exemplary embodiment, the display 210 displays the video content and the UI with the same resolution.

In an exemplary embodiment, the storage unit 220 stores a video frame buffer 222 storing the video content having the first resolution and at least one partial frame buffer 226. The at least one partial frame buffer 226 may utilize a part of a memory space of a graphic frame buffer 224 to store graphic data for displaying the UI.

In another exemplary embodiment, the storage unit 220 stores information about a size and a location of a first region on which the UI is displayed. The information about the size and the location of the first region can be stored in a memory space separate from a memory space to which the video frame buffer 222 and the graphic frame buffer 224 are allocated. For example, the storage unit 220 may include a RAM (random-access memory) allocated to the video frame buffer 222 and the graphic frame buffer 224 and a separate memory (for example, a RAM, a flash memory, an electrically erasable programmable read-only memory (EE-PROM), etc.) for storing the information about the size and the location of the first region.

In some exemplary embodiments, the controller 230 allocates at least one partial frame buffer 226 based on a size and a location of a region on a screen of the display 210 on which the UI is displayed. The controller 230 controls the UI having the first resolution based on at least one piece of partial graphic data that is stored in the allocated partial frame buffer 226.

In an exemplary embodiment, the controller 230 includes a graphics processing unit (GPU) (not shown) for performing graphics processing on video. The controller 230 can be implemented as a system-on-chip (SoC) that combines a core (not shown) and the GPU (not shown).

In an exemplary embodiment, the controller 230 obtains the video data and at least one piece of graphic data at the same period. For example, the controller 230 obtains the video data and at least one piece of graphic data at 60 Fps. In another exemplary embodiment, the controller 230 obtains at least one piece of graphic data at a predetermined time. For example, the controller obtains at least one piece of graphics data when the UI is displayed. The time when the UI is displayed can be stored in the storage unit 220.

In an exemplary embodiment, the controller 230 splits the screen of the display 210 into a plurality of regions with a predetermined size and allocates at least one partial frame buffer 226 based on the predetermined size. For example, the predetermined size may be ⅛, ¼, ⅓, or ½ of the screen of the display 210.

The controller 230 controls the UI displayed on the first region based on the information about the size and the location of the first region on which the UI is displayed.

In another exemplary embodiment, the controller 230 splits the screen of the display 210 into a plurality of regions with a predetermined size and determines one of the plurality of split regions as the first region. In an exemplary embodiment, the controller 230 changes the first region to another one of the plurality of split regions based on an input to change the first region. The controller 230 controls the UI displayed on the first region that has moved based on an input to move a location of the first region.

In an exemplary embodiment, the controller 230 updates the first region based on a user input and controls the UI displayed on the updated first region.

When the display apparatus 200 allocates at least one partial frame buffer 226 based on the size and the location of the region on which the UI is displayed, a memory bandwidth improves since an entire memory space of the graphic frame buffer 224 is partially used.

Figure 3:
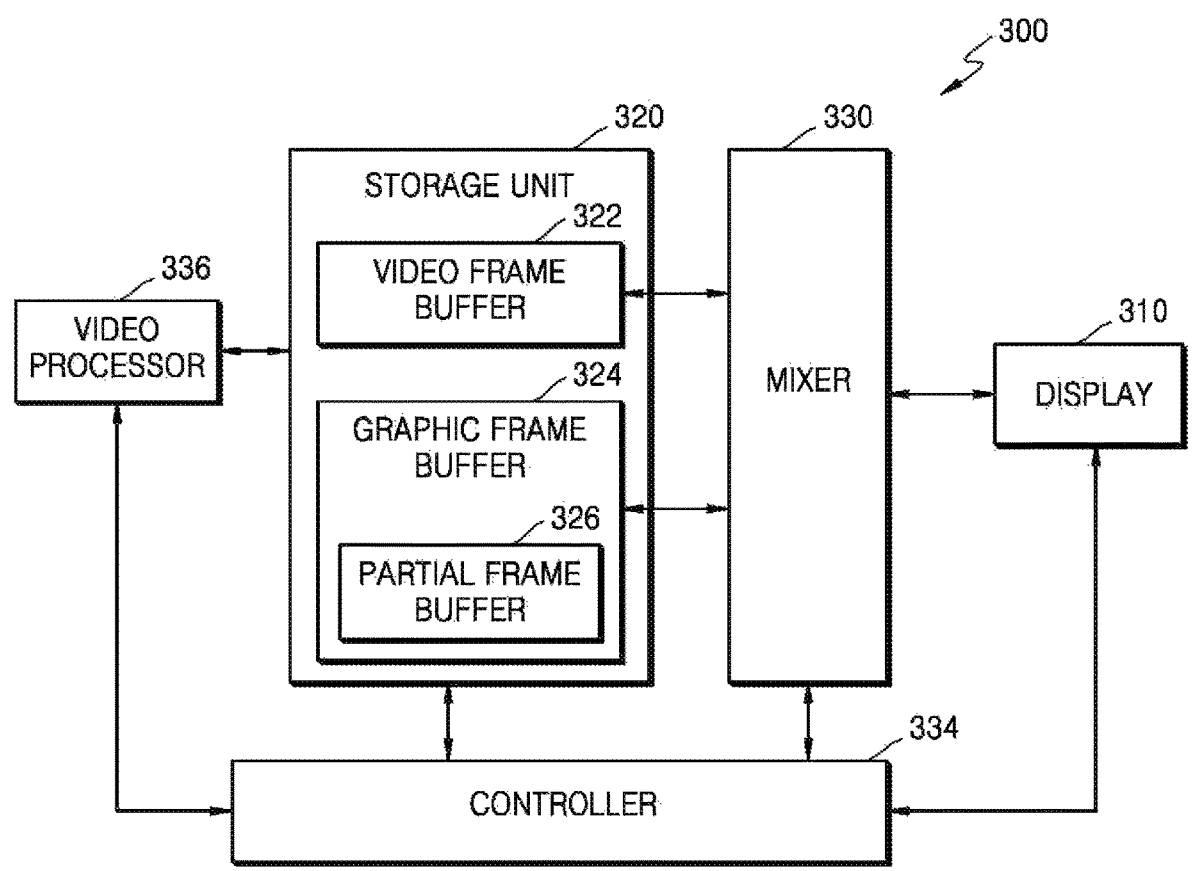
FIG. 3 is a block diagram of a display apparatus, according to an exemplary embodiment.

FIG. 3 is a block diagram of a display apparatus 300, according to an exemplary embodiment.

In an exemplary embodiment, the display apparatus 300 can include a display 310, a storage unit 320, a mixer 330, a controller 334, and a video processor 336. In an exemplary embodiment, the display 310, the storage unit 320, and the controller 334 of FIG. 3 includes functions of the display 210, the storage unit 220, and the controller 230, respectively, described with reference to FIG. 2.

In an exemplary embodiment, the mixer 330 mixes and outputs video data and graphic data. For example, the mixer 330 obtains video data stored in a video frame buffer 322 and at least one piece of partial graphic data stored in at least one partial frame buffer 326 and mixes and outputs the video data and at least one piece of partial graphic data.

In an exemplary embodiment, the mixer 330 mixes the video data and at least one piece of partial graphic data based on information about a size and a location of a region on which a UI is displayed.

In an exemplary embodiment, the mixer 330 can be configured as a hardware mixer. In another exemplary embodiment, the mixer 330 can be configured as a software mixer.

In an exemplary embodiment, the video processor 336 processes video data received by the display apparatus 300. The video processor 336 can perform various kinds of image processing such as such as decoding, scaling, noise filtering, frame rate conversion, resolution conversion on the video data, or other kinds of image processing known by one or ordinary skill in the art. In an exemplary embodiment, when video content has an UHD image quality, the video processor 336 includes an UHD video decoding module to decode the video content.

Figure 4:
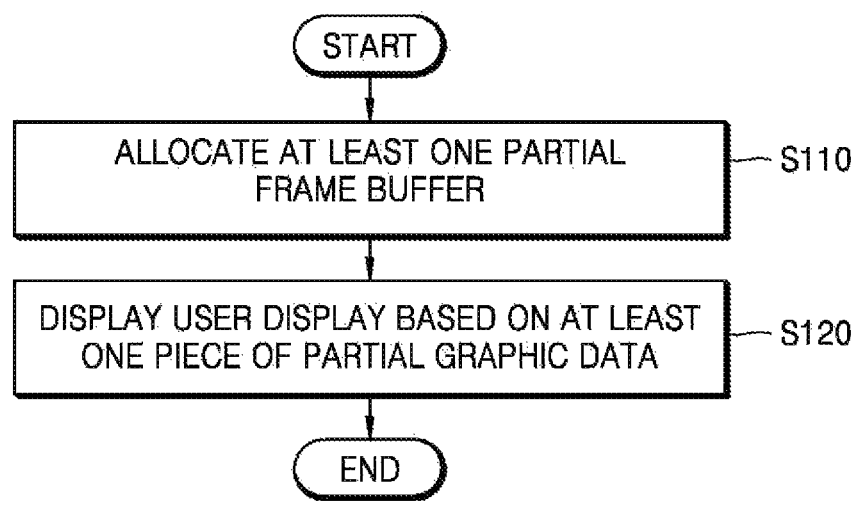
FIG. 4 is a flowchart illustrating an operational method of a display apparatus, according to an exemplary embodiment.

FIG. 4 is a flowchart illustrating an operational method of the display apparatus 100, according to an exemplary embodiment.

The display apparatus 100 allocates at least one partial frame buffer (S110). In some exemplary embodiments, The at least one partial frame buffer can correspond to a part of a memory space of a graphic frame buffer that stores graphic data for displaying a UI. The memory space of the at least one partial frame buffer can correspond to a size of a region on which the UI is displayed.

In an exemplary embodiment, the display apparatus 100 allocates the at least one partial frame buffer based on a size and a location of a region of a screen of the display apparatus 100 on which the UI is displayed.

The display apparatus 100 displays the UI based on at least one piece of partial graphic data (S120) and ends. In some exemplary embodiments, the display apparatus 100 displays the UI based on at least one piece of partial graphic data obtained by the allocated at least one partial frame buffer.

Figure 5:
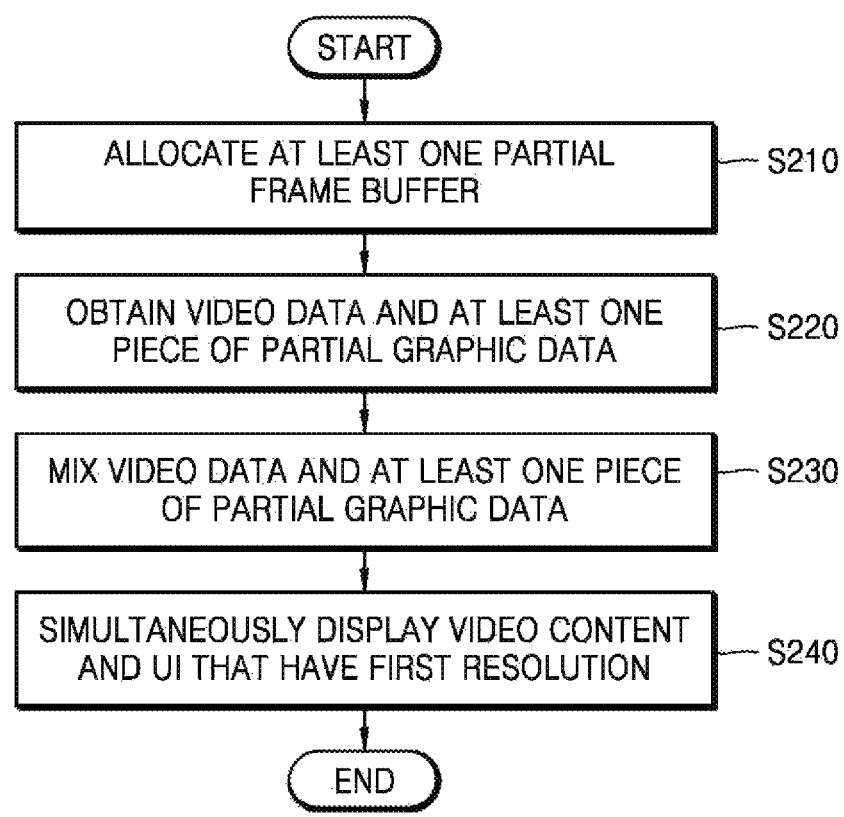
FIG. 5 is a flowchart illustrating an operational method of a display apparatus, according to an exemplary embodiment.

FIG. 5 is a flowchart illustrating an operational method of the display apparatus 100, according to an exemplary embodiment.

The display apparatus 100 allocates at least one partial frame buffer (S210). In some exemplary embodiments, the display apparatus 100 allocates the at least one partial frame buffer based on a size and a location of a region of a screen of the display apparatus 100 on which a UI is displayed.

The display apparatus 100 obtains video data and at least one piece of partial graphic data (S220). For example, the display apparatus 100 may obtain video data stored in a video frame buffer at 60 Fps. The display apparatus 100 may also obtain at least one piece of partial graphic data stored in the least one partial frame buffer at 60 Fps.

The display apparatus 100 mixes the video data and the at least one piece of partial graphic data (S230).

The display apparatus 100 simultaneously displays video content and a UI that have a first resolution (S240). In an exemplary embodiment, the first resolution includes an UHD or a resolution clearer than the UHD.

Figure 6A:
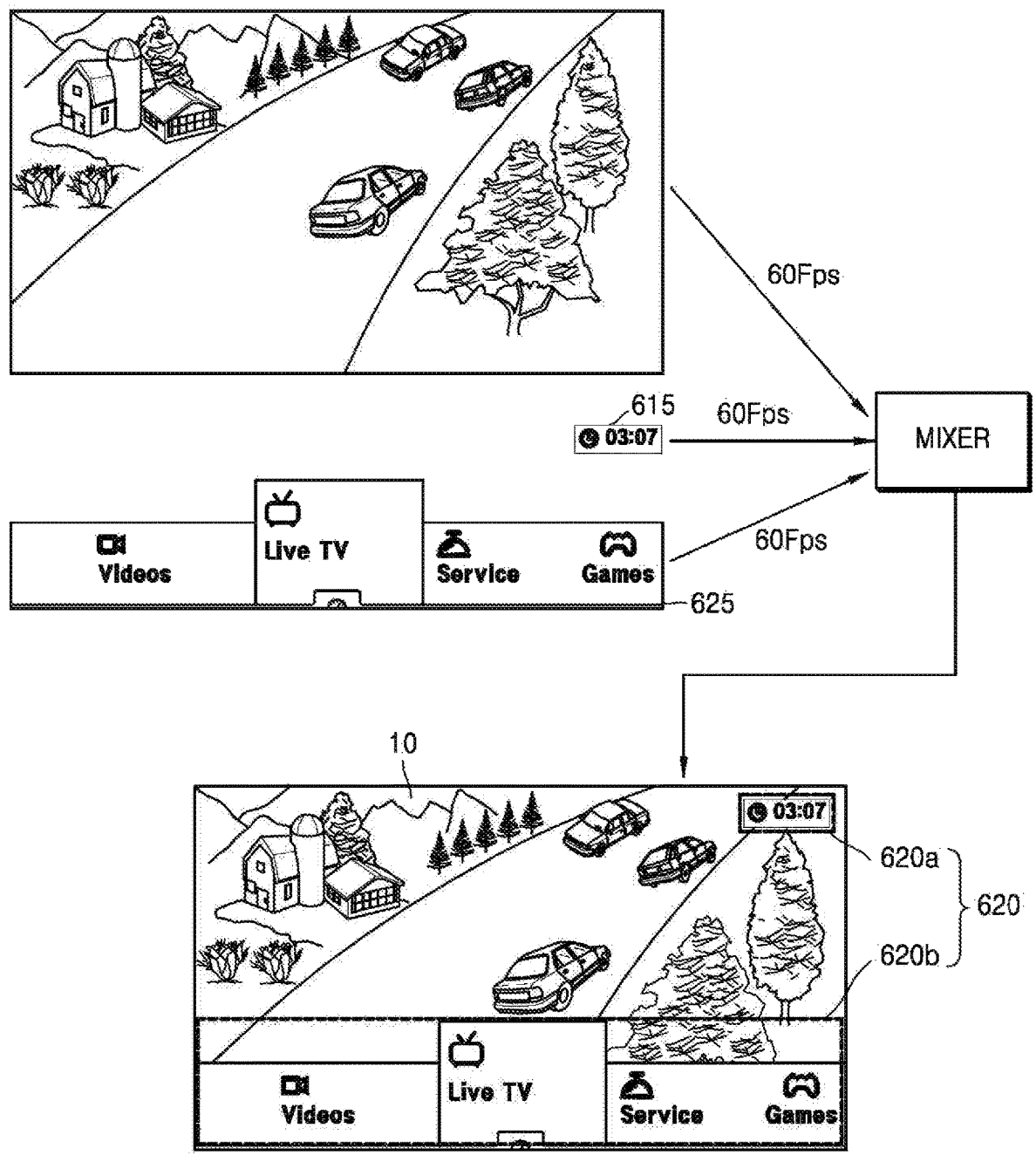
FIG. 6A is a block diagram illustrating a display apparatus displaying a user interface (UI) corresponding to a partial graphic frame buffer, according to an exemplary embodiment.

FIG. 6A is a block diagram illustrating the display apparatus 100 displaying a UI 620 corresponding to a partial graphic frame buffer, according to an exemplary embodiment.

In an exemplary embodiment, the display apparatus 100 generates graphic planes 615 and 625 corresponding to a size of a region on which the UI 620 is displayed. The graphic planes 615 and 625 may be obtained by a GPU (not shown) or a CPU (not shown) that generates the UI 620. The display apparatus 100 stores at least one piece of graphic data corresponding to the graphic planes 615 and 625 in at least one partial frame buffer.

In an exemplary embodiment, a mixer of the display apparatus 100 obtains, mixes, and outputs video data and the at least one piece of graphic data at 60 Fps on a screen of the display apparatus 100. The mixer may obtain data by accessing a memory allocated to a video frame buffer or a graphic frame buffer.

The display apparatus 100 displays the UI 620 including a first UI 620a and a second UI 620b based on the at least one piece of graphic data corresponding to the graphic planes 615 and 625. The display apparatus 100 displays the UI 620 having the same resolution as that of the video content 10.

In an exemplary embodiment, the display apparatus 100 displays the first UI 620a and the second UI 620b based on location information of regions on which the first UI 620a and the second UI 620b are displayed. The GPU (not shown) or the CPU (not shown) may obtain the location information of the regions on which the first UI 620a and the second UI 620b are displayed when the UI 620 is generated.

Figure 6B:
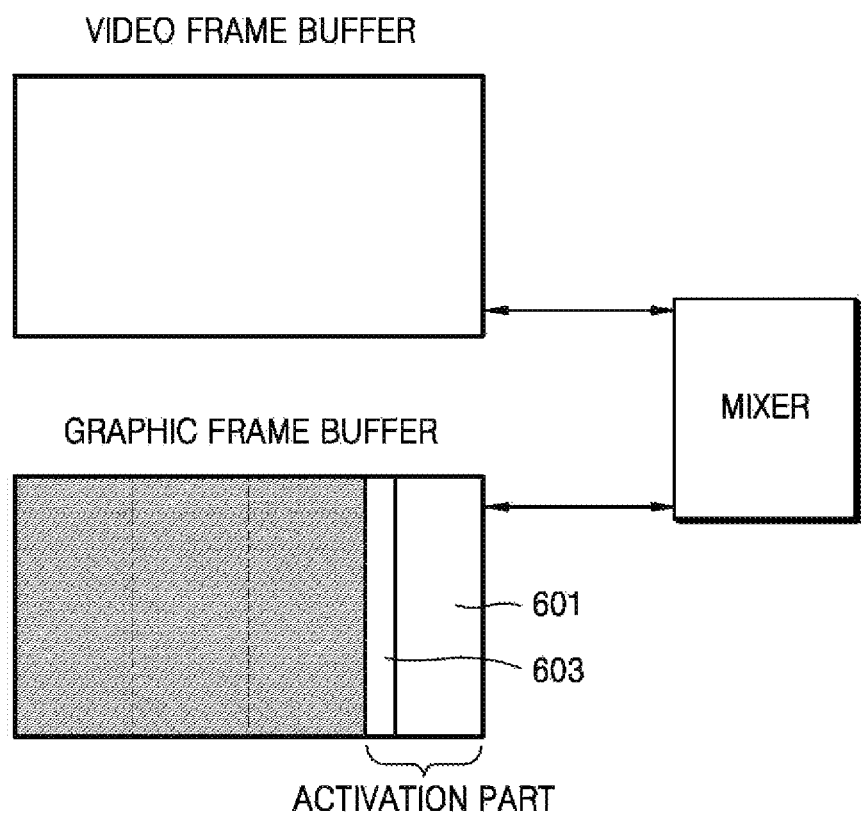
FIG. 6B is a block diagram illustrating a display apparatus allocating memory spaces of a video frame buffer and a graphic frame buffer, according to an exemplary embodiment.

FIG. 6B is a block diagram illustrating the display apparatus 100 allocating memory spaces of a video frame buffer and a graphic frame buffer, according to an exemplary embodiment.

In an exemplary embodiment, the display apparatus 100 allocates a first partial frame buffer 601 corresponding to the first UI 620a (as shown in FIG. 6A) and a second partial frame buffer 603 corresponding to the second UI 620b (as shown in FIG. 6A). The first partial frame buffer 601 can be allocated based on a size and a location of a region on which the first UI 620a is displayed. The second partial frame buffer 603 can be allocated based on a size and a location of a region on which the second UI 620b is displayed. For example, as shown in FIG. 6A, when the first UI 620a and the second UI 620b are displayed away from each other at different locations, the display apparatus 100 allocates the first partial frame buffer 601 and the second partial frame buffer 603, respectively corresponding to locations of the first UI 620a and the second UI 620b.

The number of pixels corresponding to an entire screen may be 3840×2160, the number of pixels corresponding to a region on which the second UI 620b is displayed may be 3840×500, and the number of pixels corresponding to a region on which the first UI 620a is displayed may be 500×200. The display apparatus 100 allocates the first partial frame buffer 601 of (3840×500)×4 (byte) corresponding to the second UI 620b and allocates the second partial frame buffer 603 of (500×200)×4 (byte) corresponding to the first UI 620a.

The memory spaces (as shown in FIG. 6B), to which the first partial frame buffer 601 and the second partial frame buffer 603 are allocated, may be referred to as an activation part having the total of 8 MB.

In an exemplary embodiment, the display apparatus 100 obtains graphic data necessary for displaying UIs in the first partial frame buffer 601 and the second partial frame buffer 603 at 60 Fps. In this regard, a memory bandwidth for UIs of the display apparatus 100 may be 0.48 GB/sec according to 8 MB×60 Fps.

FIGS. 6A and 6B illustrate two graphic planes corresponding to UIs displayed by the display apparatus 100; however, the present disclosure is not limited thereto. In other exemplary embodiments, three or more graphic planes may be present.

Figure 7:
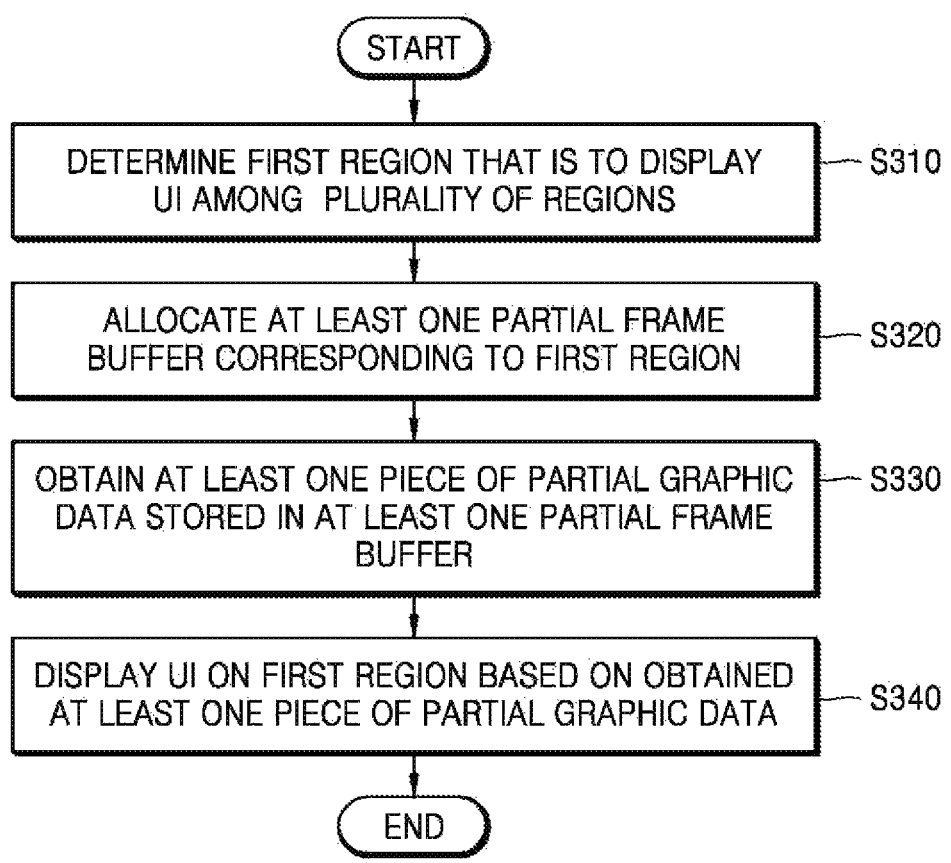
FIG. 7 is a flowchart illustrating an operational method of a display apparatus, according to an exemplary embodiment.

FIG. 7 is a flowchart illustrating an operational method of the display apparatus 100, according to an exemplary embodiment.

The display apparatus 100 determines a first region that is to display a UI among a plurality of regions (S310). In some exemplary embodiments, the display apparatus 100 splits a screen of a display into a plurality of regions with a predetermined size. For example, the display apparatus 100 obtains the plurality of regions by splitting the screen into 4 regions, 8 regions, etc. The display apparatus 100 determines one of the plurality of regions as the first region.

The display apparatus 100 allocates at least one partial frame buffer corresponding to the first region (S320).

The display apparatus 100 obtains at least one piece of partial graphic data stored in the at least one partial frame buffer (S330).

The display apparatus 100 displays the UI on the first region based on the obtained at least one piece of partial graphic data (S340) and ends.

Figure 8A:
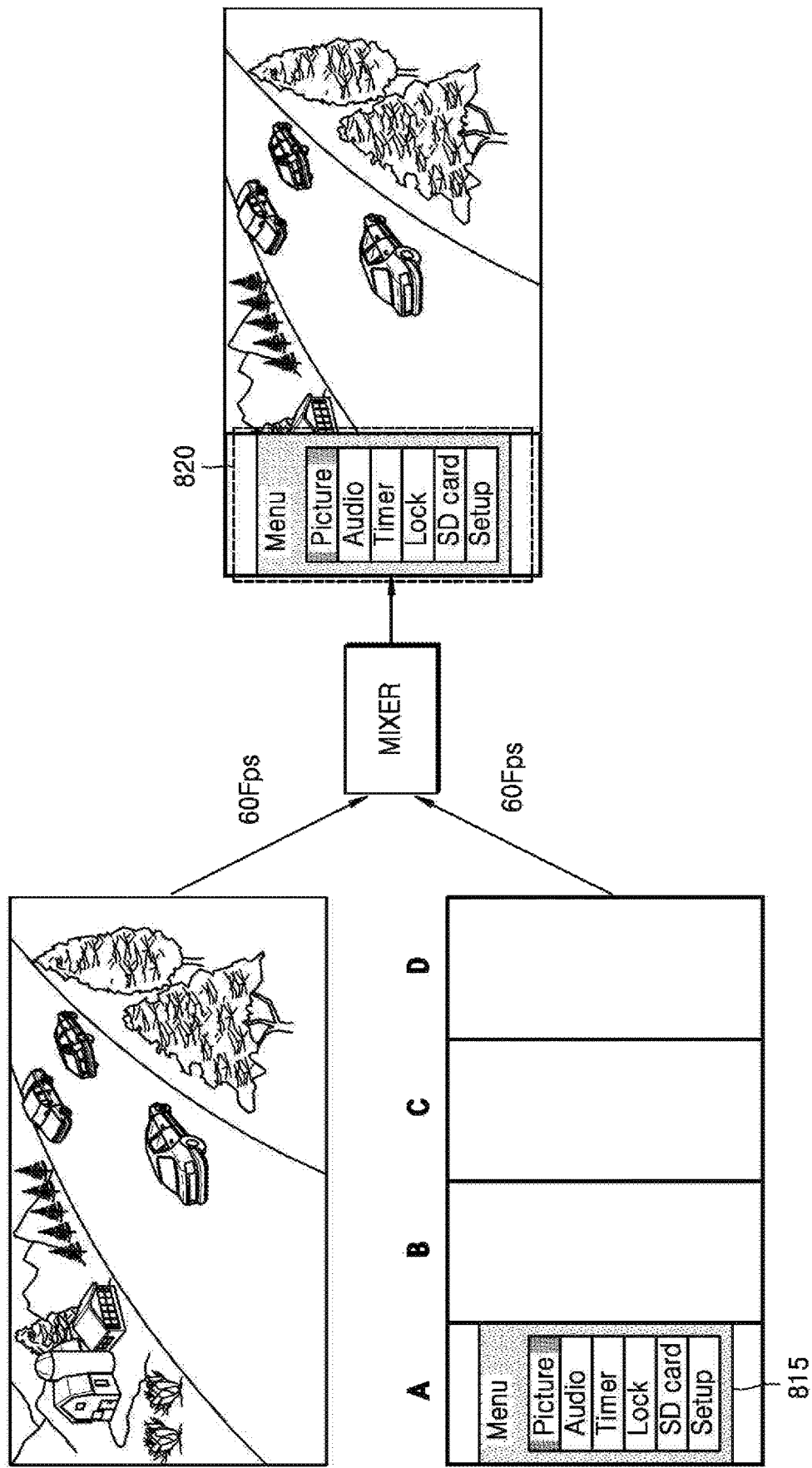
FIG. 8A is a block diagram illustrating a display apparatus determining a display location of a UI corresponding to a partial graphic frame buffer, according to an exemplary embodiment.

FIG. 8A is a block diagram illustrating the display apparatus 100 determining a display location of a UI 820 corresponding to a partial graphic frame buffer, according to an exemplary embodiment.

In some exemplary embodiments, the display apparatus 100 splits a screen of a display into a plurality of regions A, B, C, and D with a predetermined size. The display apparatus 100 generates a graphic plane 815 corresponding to a size of a one of the plurality of split regions A, B, C, and D. The display apparatus 100 stores at least one piece of partial graphic data corresponding to the graphic plane 815 in a partial frame buffer. The display apparatus 100 displays the UI 820 based on the partial graphic data corresponding to the graphic plane 815.

In an exemplary embodiment, the display apparatus 100 displays the UI 820 based on location information of a region on which the UI 820 is displayed. For example, the display apparatus 100 may display the UI 820 on a first region. The display apparatus 100 may determine one of the plurality of regions A, B, C, and D as the first region. The plurality of regions A, B, C, and D may be obtained by splitting the screen of the display apparatus 100 into 4 regions, 8 regions, etc. In this regard, the display apparatus 100 determines the first region as one of the plurality of regions A, B, C, and D, and thus reducing a hardware complexity, compared to a case of obtaining location information of a region on which the first UI 620a and the second UI 620b are displayed as shown in FIG. 6A.

The plurality of regions A, B, C, and D of FIG. 8A are merely illustrative, and in other exemplary embodiments, the display may be split into various shapes of regions. For example, the plurality of regions A, B, C, and D may have a horizontally arranged shape or a 2×2 arranged shape.

Figure 8B:
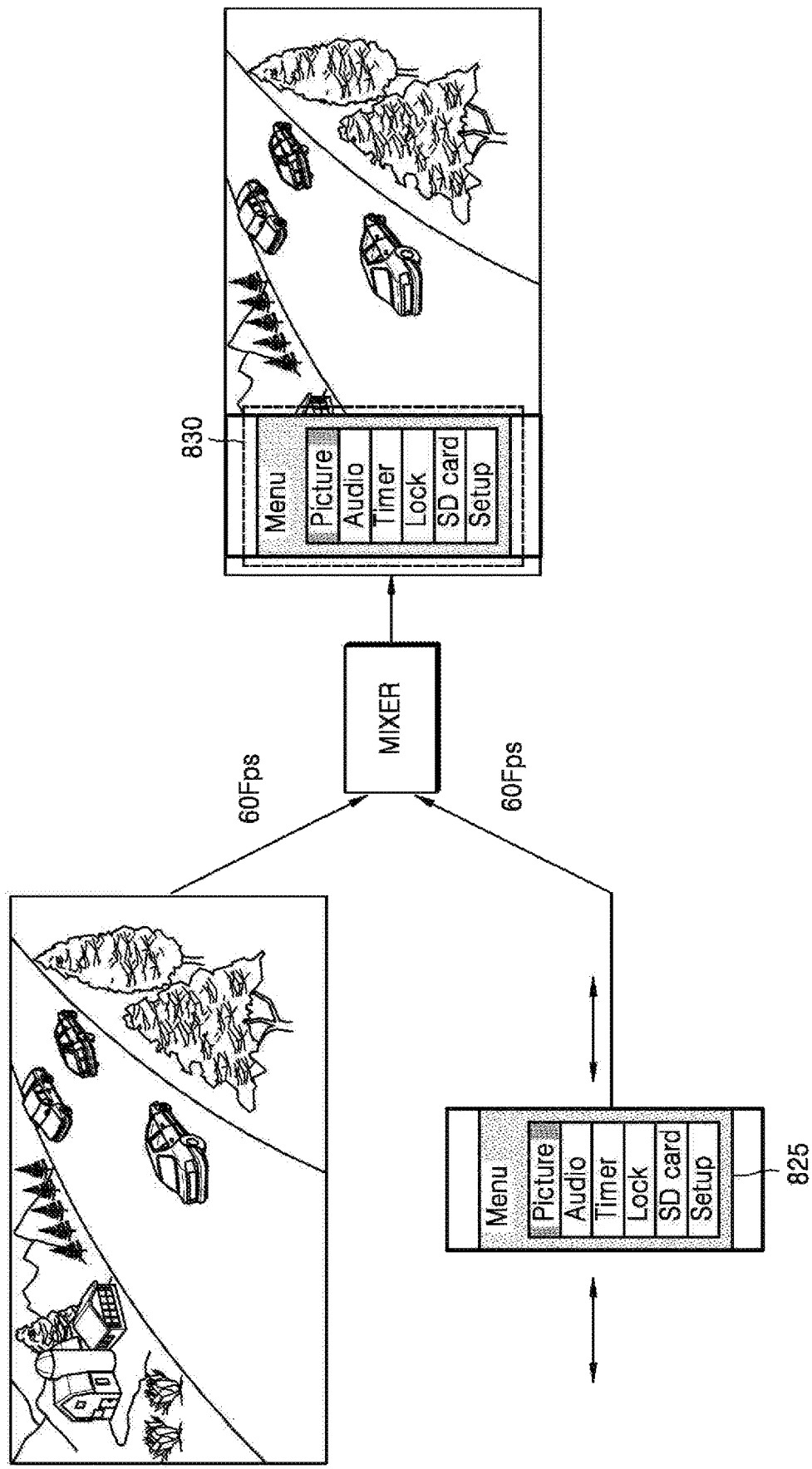
FIG. 8B is a block diagram illustrating a display apparatus changing a display location of a UI corresponding to a partial graphic frame buffer, according to an exemplary embodiment.

FIG. 8B is a block diagram illustrating the display apparatus 100 changing a display location of a UI 830 corresponding to a partial graphic frame buffer, according to an exemplary embodiment.

In an exemplary embodiment, the display apparatus 100 receives an input to move a first region by a predetermined offset. The display apparatus 100 displays the UI 830 on the first region that has moved based on partial graphic data corresponding to a graphic plane 825.

In another exemplary embodiment, the display apparatus 100 moves the first region that is the display location of the UI 830, for example, based on a user input. The display apparatus 100 moves the first region that is the display location of the UI 830 according to a program, which may be stored locally in the display apparatus.

Figure 8C:
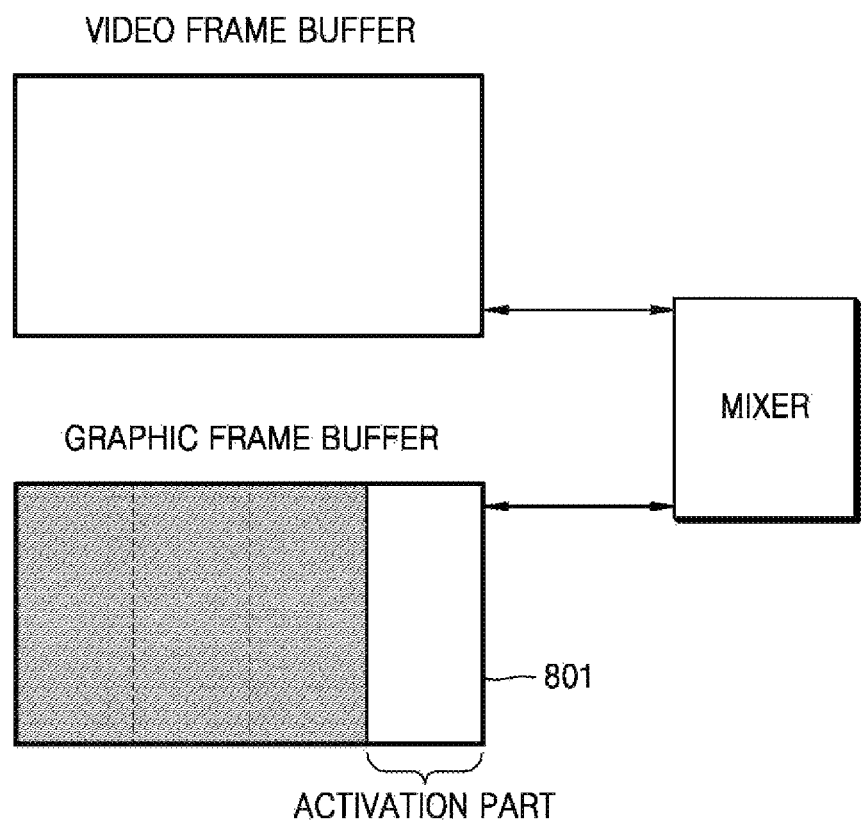
FIG. 8C is a block diagram illustrating a display apparatus allocating memory spaces of a video frame buffer and a graphic frame buffer, according to an exemplary embodiment.

FIG. 8C is a block diagram illustrating a display apparatus 100 allocating memory spaces of a video frame buffer and a graphic frame buffer, according to an exemplary embodiment.

In an exemplary embodiment, the display apparatus 100 allocates a partial frame buffer 801 corresponding to each of the UI 820 of FIG. 8A and the UI 830 of FIG. 8B. When the display apparatus 100 splits a screen of a display to have a predetermined size, the display apparatus 100 allocates the partial frame buffer 810 based on the predetermined size. A memory space to which the partial frame buffer 810 corresponding to the predetermined size is allocated may be referred to as an activation part. For example, when the predetermined size is ¼ of an entire screen and the number of pixels corresponding to the entire screen is 3840×2160, the activation part may have a total of 8 MB.

Figure 9:
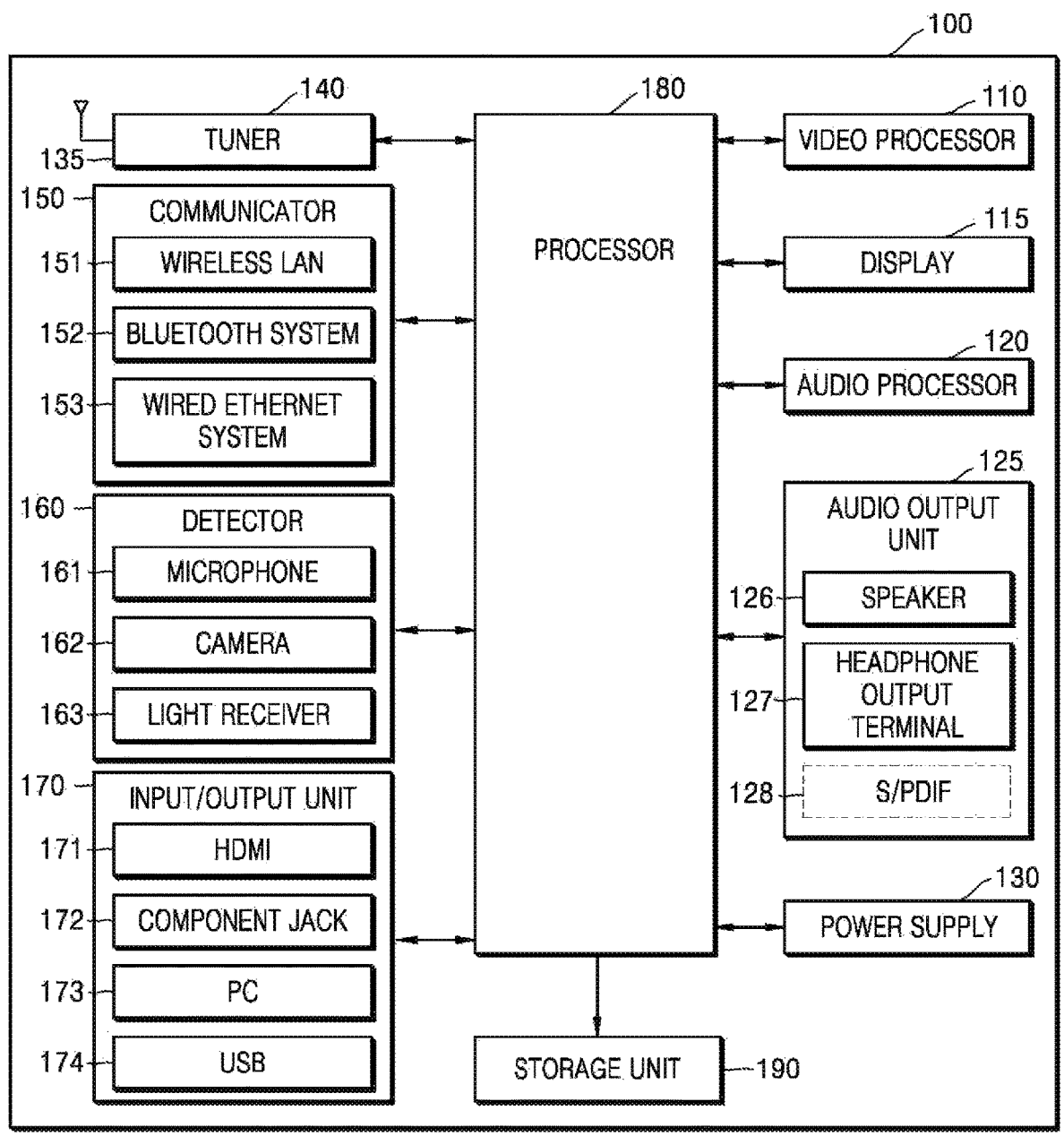
FIG. 9 is a block diagram of a display apparatus, according to an exemplary embodiment.

FIG. 9 is a block diagram of a display apparatus 100, according to an exemplary embodiment.

In an exemplary embodiment, the display apparatus 100 includes a video processor 110, a display 115, an audio processor 120, an audio output interface 125, a power supply 130, a tuner 140, a communicator 150, a detector 160, an input/output unit 170, a processor 180, and a storage unit 190.

In an exemplary embodiment, the video processor 110 processes video data received by the display apparatus 100. The video processor 110 can perform various image processing such as decoding, scaling, noise filtering, frame rate conversion, or resolution conversion on the video data. In another exemplary embodiment, when video content has an UHD image quality, the video processor 110 includes an UHD video decoding module to decode the video content.

In an exemplary embodiment, the display 115 displays, on a screen, a video included in a broadcast signal received through the tuner 440 under control of the processor 180. The display 115 displays content (e.g., a moving image) input through the communicator 150 or the input/output unit 170 under control of the processor 180. The display 115 outputs an image stored in the storage unit 190 under control of the processor 180. The display 115 displays a voice user interface (UI) (e.g., including a voice command guide) for performing a voice recognition task corresponding to voice recognition, or a motion UI (e.g., including a user motion guide for motion recognition) for performing a motion recognition task corresponding to motion recognition.

In an exemplary embodiment, the display 115 of FIG. 9 may include all functions of the display 210 of FIG. 2 and the display 310 of FIG. 3.

In an exemplary embodiment, the audio processor 120 processes audio data. The audio processor 120 can perform various processing such as decoding, amplification, or noise filtering on the audio data. The audio processor 120 includes a plurality of audio processing modules in order to process audio corresponding to a plurality of pieces of content.

In an exemplary embodiment, the audio output unit 125 outputs audio included in a broadcast signal received through the tuner 140, under control of the processor 180. In another exemplary embodiment, the audio output unit 125 outputs audio (e.g., voice or sound) input through the communicator 150 or the input/output unit 170. In yet another exemplary embodiment, the audio output unit 125 outputs audio stored in the storage unit 190, under control of the processor 180. In an exemplary embodiment, the audio output unit 125 can include at least one of a speaker 126, a headphone output terminal 127, and a Sony/Philips digital interface (S/PDIF) output terminal 128. In another exemplary embodiment, the audio output unit 125 can include a combination of the speaker 126, the headphone output terminal 127, and the S/PDIF output terminal 128.

In an exemplary embodiment, the power supply 130 supplies power input from an external power supply source to elements (110 through 190) of the display apparatus 100, under control of the processor 180. In another exemplary embodiment, the power supply 130 supplies power output from one or more batteries (not shown) provided in the display apparatus 100 to the elements (110 through 190), under control of the processor 180.

In an exemplary embodiment, the tuner 140 tunes and selects a frequency of a channel to be received by the display apparatus 100 from electromagnetic waves components by performing amplification, mixing, or resonance on a broadcast signal received by wired or wirelessly. The broadcast signal can include audio, video, and additional information (e.g., an electronic program guide (EPG)).

In another exemplary embodiment, the tuner 140 receives a broadcast signal in a frequency band corresponding to a channel number (for example, a cable broadcast 506) according to a user input (for example, a control signal received from a control device 15, for example, a channel number input, a channel up-down input, and a channel input to an EPG screen).

In yet another exemplary embodiment, the tuner 140 receives a broadcast signal from various sources such as a terrestrial broadcast, a cable broadcast, a satellite broadcast, an Internet broadcast, etc. The tuner 140 can receive a broadcast signal from a source such as an analog broadcast or a digital broadcast. The broadcast signal received by the tuner 140 can be decoded (for example, audio decoding, video decoding, or additional information decoding) and separated into audio, video, and/or additional information. In an exemplary embodiment, the processor 180 stores the separated audio, video, and/or additional information in the storage unit 190.

In an exemplary embodiment, the display apparatus 100 includes one tuner 140 or a plurality of tuners 140. When the display apparatus 100 includes the plurality of tuners 140, a plurality of broadcast signals may be output to a plurality of windows configuring a multi window screen provided to the display 115.

In an exemplary embodiment, the tuner 140 can be implemented as all-in-one with the display apparatus 100. In another exemplary embodiment, the tuner 140 can be implemented as a separate apparatus (for example, a settop box (not shown)) having a tuner electrically connected to the display apparatus 100. In yet another exemplary embodiment, the tuner can be connected to the input/output unit 170.

In an exemplary embodiment, the communicator 150 connects the display apparatus 100 to an external apparatus (for example, an audio apparatus, etc.) under control of the processor 180. In an exemplary embodiment, the processor 180 transmits and receives content to and from the external apparatus connected through the communicator 150. The processor 180 can download or web browse an application from the external apparatus. In an exemplary embodiment, the communicator 150 includes one of a wireless local area network (LAN) 151, a Bluetooth system 152, and a wired Ethernet system 153 according to a performance and a structure of the display apparatus 100. In another exemplary embodiment, the communicator 150 includes a combination of the wireless LAN 151, the Bluetooth system 152, and the wired Ethernet system 153.

In an exemplary embodiment, the communicator 150 receives a control signal of the control device 15 under control of the processor 180. The control signal can be a Bluetooth signal, a radio frequency (RF) signal, or a WiFi signal. The communicator 150 can further include a short-range communication system (e.g., a NFC system (not shown) or a BLE system (not shown)) other than the Bluetooth system 152.

In an exemplary embodiment, the detector 160 can detect a user's voice, image, or interaction.

In an exemplary embodiment, the microphone 161 receives user's uttered voice. The microphone 161 converts the received voice into an electrical signal and outputs the electrical signal to the processor 180. The user's voice may include, for example, voice corresponding to a menu or a function of the display apparatus 100. In an exemplary embodiment, a recognition range between the microphone 161 and a position of the user can be 4 m. In another exemplary embodiment, the recognition range can vary according to a user's voice tone and an ambient environment (e.g., a speaker sound or ambient noise).

In an exemplary embodiment, the microphone 161 resides integrally with the display apparatus 100. In another exemplary embodiment, the microphone 161 resides separately from the display apparatus 100. The separated microphone 161 can be electrically connected to the display apparatus 100 through the communicator 150 or the input/output unit 170. In another exemplary embodiment, the microphone 161 can be omitted according to the performance and the structure of the display apparatus 100.

In an exemplary embodiment, the camera 162 receives an image (e.g., continuous frames) corresponding to a motion of the user including a gesture within a camera recognition range. For example, a recognition range between the camera 162 and the user can be a distance from 0.1 m to 5 m. The motion of the user can include, for example, a part of a user's body such as a user's face, a facial expression, a hand, a fist, and a finger or a motion of the part of the user's body. The camera 162 converts the received image into an electrical signal under control of the processor 180. The camera 162 outputs the electrical signal to the processor 180. The processor 180 selects a menu displayed on the display apparatus 100 by using a received motion recognition result. The processor 180 performs control corresponding to the motion recognition result. For example, the processor 180 performs control such as an adjustment of volume, a movement of a cursor, etc.

In an exemplary embodiment, the camera 162 includes a lens (not shown) and an image sensor (not shown). The camera 162 supports an optical zoom or a digital zoom by using a plurality of lenses and image processing. The recognition range of the camera 162 can be set according to an angle and a peripheral environment condition. In an exemplary embodiment, when the display apparatus 100 includes a plurality of cameras 162, the plurality of cameras 162 receives a 3D still image or a 3D motion.

In an exemplary embodiment, the camera 162 resides integrally with the display apparatus. In another exemplary embodiment, the camera 162 resides separately from the display apparatus 100. The separated camera 162 (not shown) can be electrically connected to the display apparatus 100 through the communicator 150 or the input/output unit 170. In yet another exemplary embodiment, the camera 162 can be omitted according to the performance and the structure of the display apparatus 100.

In an exemplary embodiment, the light receiver 163 receives a light signal (including a control signal) received from an external control apparatus (not shown) through a light window (not shown) in a bezel of the display 115. The light receiver 163 receives a light signal corresponding to a user input (e.g., a touch, a push, a touch gesture, voice, or a motion). The processor 180 can extract the control signal from the received light signal. In an exemplary embodiment, the light receiver 163 can be omitted according to the performance and the structure of the display apparatus 100.

In an exemplary embodiment, the input/output interface 170 can receive video (e.g., a moving image, etc.), audio (e.g., voice, music, etc.), additional information (e.g., an EPG), etc. from the outside of the display apparatus 100, under control of the processor 180. The input/output interface 170 can include at least one of an HDMI port 171, a component jack 172, a PC port 173, and a USB port 174. The input/output interface 170 can further include at least one of a D-sub port, a digital visual interface (DVI) port, ad a DP port according to an implementation example. In an exemplary embodiment, the input/output interface 170 can be configured and operate in various ways.

In an exemplary embodiment, the processor 180 controls an overall operation of the display apparatus 100 and a signal flow between the elements 110 through 190 of the display apparatus 100 and process data. When a user input exists or a preset and stored condition is satisfied, the processor 180 executes an operating system (OS) and various applications that are stored in the storage 190.

In an exemplary embodiment, the processor 180 includes a GPU (not shown) for performing graphics processing on video. In another exemplary embodiment, the processor 180 may be implemented as a system-on-chip (SoC) that combines a core (not shown) and the GPU (not shown).

In an exemplary embodiment, the processor 180 of FIG. 9 includes all functions of each of the controller 230 of FIG. 2, the controller 334 of FIG. 3, and the mixer of FIG. 3.

In an exemplary embodiment, the storage unit 190 stores various data, programs, or applications for driving and controlling the display apparatus 100, under control of the processor 180. The storage unit 190 stores input/output signals or data corresponding to driving of the video processor 110, the display 115, the audio processor 120, the audio output unit 125, the power supply 130, the communicator 150, the detector 160, and the input/output unit 170. The storage unit 190 stores control programs for controlling the display apparatus 100 and the processor 180 and applications initially provided from a manufacturer or downloaded from the outside. The storage unit 190 stores resources such as a JavaScript file, an XML file, etc. used in applications.

In an exemplary embodiment, the storage unit 190 includes a presentation module. The presentation module is a module for configuring a display screen. The presentation module can include a multimedia module for reproducing and outputting multimedia content and a UI rendering module for performing UI and graphics processing. The multimedia module can include a player module, a camcorder module, and a sound processing module. The multimedia module can reproduce a variety of multimedia content and can generate and reproduce an image and a sound. The UI rendering module can include an image composition module that combines images, a coordinate combination module that combines and generates coordinates on a screen on which an image is displayed, an X11 module that receives various events from hardware, and a 2D/3D UI toolkit that provides a tool for forming a 2D or 3D UI.

In some exemplary embodiments, the storage unit 190 stores a GUI related to an application, an object (e.g., an image, text, an icon, a button, etc.) for providing the GUI, user information, a document, databases, or related data. The storage unit 190 stores an OS executed when the display apparatus 100 is powered on. The storage unit 190 stores a resident program Daemon of the display apparatus 100. The storage unit 190 stores a DRM decoding module for decoding a DRAM of an application executed in the display apparatus 100.

In some exemplary embodiments, the storage unit 190 includes ROM for storing a control program that controls the display apparatus 100, RAM for storing a signal or data input corresponding to various operations performed by the display apparatus 100, or a memory card (e.g., a micro secure digital (SD) card or a USB memory (not shown)) connected to the display apparatus 100. The storage unit 190 can include nonvolatile memory, volatile memory, flash memory, a hard disk drive (HDD), or a solid-state drive (SSD).

In some exemplary embodiments, the storage unit 190 includes a volume control module, a communication control module, a voice recognition module, a motion recognition module, a light reception module, a display control module, an audio control module, an external input control module, a power control module, a power supply control module of an external apparatus that is connected through wireless communication (e.g., Bluetooth), a voice database (DB), or a motion DB (all of which are not shown). The modules and the DBs of the storage unit 190 can be configured as software for the display apparatus 100 to perform functions of volume control, communication control, voice recognition, motion recognition, light reception control, audio control, external input control, power control, and display control of controlling a cursor or a scrolled item to be displayed. The processor 180 performs each function by using the software stored in the storage unit 190.

In an exemplary embodiment, the storage unit 190 of FIG. 9 includes the features of the storage unit 220 of FIG. 2 and the storage unit 230 of FIG. 3. For example, a video frame buffer and at least one partial frame buffer corresponding to video content having a first resolution may be allocated to the storage unit 190.

In an exemplary embodiment, the display apparatus 100 is electrically connected to a separate external apparatus (e.g., a set-top box (not shown)) having a tuner. For example, the display apparatus 100 may be implemented as an analog TV, a digital TV, a 3D TV, a smart TV, an LED TV, an OLED TV, a plasma TV, a monitor, or any other monitor or display understood by one of ordinary skill in the art.

In an exemplary embodiment, the display apparatus 100 further includes a sensor (e.g., an illumination sensor, a temperature sensor, a light sensor, etc. (not shown)) that detects an internal or external state of the display apparatus 100. In an exemplary embodiment, the light sensor senses an amount of light around the display apparatus 100.

In an exemplary embodiment, at least one element may be added to or omitted from the elements (i.e., 110 through 190) of the display apparatus 100 based on the performance of the display apparatus 100. In some exemplary embodiments, the positions of the elements (i.e., 110 through 190) can vary according to the performance or a structure of the display apparatus 100.

According to one or more exemplary embodiments, a display apparatus and a display method may allocate frame buffers based on a size and a location of a region of a screen including a UI, in which the UI has a resolution corresponding to a resolution of high resolution content.

According to one or more exemplary embodiments, a display apparatus and a display method may allocate frame buffers based on a size and a location of a region of a screen including a UI, in which the memory space and memory bandwidth are reduced.

According to one or more exemplary embodiments, a display method may be implemented as computer instructions which are executed by a computer and recorded on a non-transitory computer-readable recording medium. The non-transitory computer-readable recording medium may include program commands, data files, data structures, or a combination thereof. Examples of the non-transitory computer-readable medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Examples of the program commands include a high-level language code that may be executed by a computer using an interpreter as well as a machine language code made by a complier.

Although the subject matter has been described in terms of exemplary embodiments, it is not limited thereto. Rather, the appended claims should be construed broadly, to include other variants and exemplary embodiments, which may be made by those skilled in the art without departing from the scope and range of equivalents of the subject matter.

What is claimed is:

1. A display apparatus comprising:
   a display;
   a hardware mixer;
   a memory; and
   a controller configured to:
      allocate, in the memory, a video frame buffer corresponding to an entire screen of the display;
      store video data in the video frame buffer;
      obtain information on a partial region to identify a size of the partial region and a location of the partial region, the partial region being a region of the entire screen of the display on which at least one graphic object corresponding to graphic data is to be displayed;
      allocate, in the memory, a graphic frame buffer for the graphic data based on the identified size of the partial region in the memory such that a ratio of a size of the graphic frame buffer to a size of the video frame buffer corresponds to a ratio of a size of the partial region to a size of the entire screen of the display, wherein the size of the graphic frame buffer corresponding to the size of the partial region is smaller than the size of the video frame buffer corresponding to the size of the entire screen of the display;
      process the graphic data at the graphic frame buffer;
      control the hardware mixer to access the processed graphic data in the graphic frame buffer and to mix the processed graphic data with the video data by locating the processed graphic data at the partial region based on the identified location of the partial region; and
      control the display to display the video data and the processed graphic data,
   wherein the graphic data which is being displayed on the display has a display resolution equal to a display resolution of the video data which is being displayed with the graphic data, the display resolution of the graphic data being greater than or equal to 3840×2160 pixels.

2. The display apparatus of claim 1, wherein the controller is further configured to allocate a plurality of graphic frame buffers based on a number of graphic objects in the at least one graphic object.

3. The display apparatus of claim 1, wherein a memory bandwidth, which is a data amount per second stored and accessed, between the hardware mixer and the graphic frame buffer is less than a memory bandwidth between the hardware mixer and the video frame buffer.

4. The display apparatus of claim 1, wherein the controller is further configured to obtain the video data and the graphic data at a same period.

5. The display apparatus of claim 2, wherein
   the memory is further configured to store information about at least one of the size or the location for the partial region, and
   the controller is further configured to control the at least one graphic object displayed in the partial region based on the information about the at least one of the size or the location for the partial region.

6. The display apparatus of claim 5, wherein the controller is further configured to:
   split the screen of the display into a plurality of partial regions such that each of the plurality of partial regions has a predetermined size, and
   allocate the graphic frame buffer based on the predetermined size.

7. The display apparatus of claim 6, wherein the controller is further configured to change the partial region to a different partial region, from among the plurality of partial regions, based on an input to change the partial region obtained from a user.

8. The display apparatus of claim 5, wherein the controller is further configured to control the at least one graphic object displayed in the partial region that has moved based on a user input to move the partial region by a predetermined offset.

9. The display apparatus of claim 5, wherein the controller is further configured to update the partial region based on a user input and control the at least one graphic object to be displayed on the updated partial region.

10. A display method performed by a display apparatus configured to display video content and at least one graphic object, the display method comprising:
    allocating, in a memory, a video frame buffer corresponding to an entire screen of a display of the display apparatus;
    storing video data in the video frame buffer;
    obtaining information on a partial region to identify a size of the partial region and a location of the partial region, the partial region being a region of the entire screen of the display on which the at least one graphic object corresponding to graphic data is to be displayed;
    allocating, in the memory, a graphic frame buffer for the graphic data based on the identified size of the partial region such that a ratio of a size of the graphic frame buffer to a size of the video frame buffer corresponds to a ratio of a size of the partial region to an entire size of the screen of the display, wherein the size of the graphic frame buffer corresponding to the size of the partial region is smaller than the size of the video frame buffer corresponding to the size of the entire screen of the display;
    processing the graphic data at the graphic frame buffer;
    accessing the processed graphic data in the graphic frame buffer and mixing the processed graphic data with the video data by locating the processed graphic data at the partial region based on the identified location of the partial region; and displaying the video data and the processed graphic data, wherein the graphic data which is being displayed on the display has a display resolution equal to a display resolution of the video data which is being displayed with the graphic data, the display resolution of the graphic data being greater than or equal to 3840×2160 pixels.

11. The display method of claim 10, wherein the allocating the graphic frame buffer for the graphic data comprises allocating a plurality of graphic frame buffers based on a number of graphic objects in the at least one graphic object.

12. The display method of claim 10, wherein a memory bandwidth, which is a data amount per second stored and accessed, between a hardware mixer and the graphic frame buffer is less than a memory bandwidth between the hardware mixer and the video frame buffer.

13. The display method of claim 12, further comprising obtaining the video data and the graphic data at a same period.

14. The display method of claim 10, further comprising: storing information about at least one of the size or the location for the partial region, wherein the displaying the mixed video data comprises displaying the at least one graphic object based on at least one piece of partial graphic data obtained from the allocated graphic frame buffer such that the at least one graphic object is displayed in the partial region based on the information about the at least one of the size or the location for the partial region.

15. The display method of claim 14, wherein the allocating the graphic frame buffer based on the size of the partial region on the screen of the display on which the at least one graphic object is displayed comprises:

splitting the screen of the display into a plurality of partial regions such that each of the plurality of partial regions has a predetermined size; and allocating the graphic frame buffer based on the predetermined size.

16. The display method of claim 15, further comprising changing the partial region to a different partial region, from among the plurality of partial regions, based on a user input to change the partial region.

17. The display method of claim 14, wherein the displaying the at least one graphic object based on the at least one piece of partial graphic data being obtained from the allocated graphic frame buffer comprises displaying the at least one graphic object in the partial region that has moved based on a user input to move the partial region by a predetermined offset.

18. The display method of claim 14, further comprising:
updating the partial region from a first region to a second region based on a user input; and
displaying the at least one graphic object in the updated partial region.

19. A non-transitory computer-readable recording medium having recorded thereon a program executable by a computer for performing the display method of claim 10.

20. The display apparatus of claim 1, wherein a size of a memory space of the graphic frame buffer is smaller than a size of a memory space of the video frame buffer.

21. The display apparatus of claim 1, wherein the controller is further configured to calculate the size of the graphic frame buffer based on the ratio of the size of the partial region to the entire size of the screen of the display.

* * * * *